US012203001B2

(12) United States Patent
Gao et al.

(10) Patent No.: US 12,203,001 B2
(45) Date of Patent: Jan. 21, 2025

(54) SOFT TOUCH MATERIAL

(71) Applicant: Bose Corporation, Framingham, MA (US)

(72) Inventors: Kai Gao, Marlborough, MA (US); Shawn J. Prevoir, Northborough, MA (US)

(73) Assignee: Bose Corporation, Framingham, MA (US)

( * ) Notice: Subject to any disclaimer, the term of this patent is extended or adjusted under 35 U.S.C. 154(b) by 156 days.

(21) Appl. No.: 17/232,479

(22) Filed: Apr. 16, 2021

(65) Prior Publication Data

US 2022/0162475 A1 May 26, 2022

Related U.S. Application Data

(60) Provisional application No. 63/118,436, filed on Nov. 25, 2020.

(51) Int. Cl.
*C09D 183/04* (2006.01)
*B05D 1/02* (2006.01)
*C09D 153/02* (2006.01)

(52) U.S. Cl.
CPC ............. *C09D 183/04* (2013.01); *B05D 1/02* (2013.01); *C09D 153/02* (2013.01); *Y10T 428/31663* (2015.04)

(58) Field of Classification Search
CPC ...... C09D 183/04; C09D 153/02; B05D 1/02; C08J 2353/02; C08J 2453/00; C08J 2483/04; C08J 7/0427; C08J 7/046; H04R 1/10
See application file for complete search history.

(56) References Cited

U.S. PATENT DOCUMENTS

| | | | |
|---|---|---|---|
| 6,384,123 B1* | 5/2002 | Young | C08L 23/0815 524/451 |
| 8,792,665 B2 | 7/2014 | Lin | |
| 10,619,022 B2 | 4/2020 | Prevoir et al. | |
| 2007/0141362 A1 | 6/2007 | Elkins et al. | |
| 2008/0310660 A1 | 12/2008 | Lin | |
| 2010/0183814 A1* | 7/2010 | Rios | A63B 60/00 427/387 |
| 2017/0313882 A1* | 11/2017 | Boucard | C08L 23/14 |
| 2018/0002569 A1* | 1/2018 | John | H01L 24/29 |
| 2020/0177987 A1 | 6/2020 | Gao et al. | |

FOREIGN PATENT DOCUMENTS

CN 109867944 6/2019
JP 2015232095 12/2015

OTHER PUBLICATIONS

Kraton NPL document retrieved Jan. 2, 2022.*
JP 2015-232095 machine translation, retrieved Jan. 2, 2022.*
(Continued)

*Primary Examiner* — Michael B Nelson
(74) *Attorney, Agent, or Firm* — Fish & Richardson P.C.

(57) ABSTRACT

The disclosure generally relates to compositions of a soft touch material, and methods of preparing the compositions thereof. The compositions are suitable for use in apparatuses such as wearable devices, e.g., in-ear earpieces.

5 Claims, 2 Drawing Sheets

(56) References Cited

OTHER PUBLICATIONS

Ahmad et al., "Prospective study of the microbiological flora of hearing aid moulds and the efficacy of current cleaning techniques," The Journal of Laryngology & Otology, Feb. 2007, 121: 110-113.
International Search Report and Written Opinion in International Appln. No. PCT/US2021/060440, dated Mar. 22, 2022, 14 pages.
Karaca et al., "Original Contribution: External auditory canal microbiology and hearing aid use," American Journal of Otolaryngology, Jul.-Aug. 2013, 34: 278-281.
Kashiwagi et al., "Electron beam processing system and its application," SEI Tech. Rev., Oct. 2012, pp. 47-54.
Lin, "Improve Reliability of Hearing Instruments using Nano Technology," 2015 International Conference on Manipulation, Manufacturing and Measurement on the Nanoscale, Oct. 5-9, 2015, 4 pages.
Marshall, "Hearing Aid Quality: Improving Moisture and Wax Protection," Starkey Hearing Technologies, 2012, 5 pages.
Shanks et al., "Thermoplastic Elastomers," Chapter 8 Thermoplastic Elastomers, Prof. Adel El-Sonbati (Ed.), Mar. 2012, 19 pages.

\* cited by examiner

SOFT TOUCH MATERIAL

CLAIM OF PRIORITY

This application claims benefit to U.S. Provisional Patent Application Ser. No. 63/118,436, filed on Nov. 25, 2020, the entire contents of which are hereby incorporated by reference.

TECHNICAL FIELD

This disclosure generally relates to compositions of a soft touch material and methods of preparing the compositions thereof. The compositions are suitable for use in making a variety of apparatuses such as wearable devices, e.g., in-ear earpieces.

BACKGROUND

A soft touch material refers to a material characterized in that it possesses a soft, smooth and slippery texture and surface, which provides tactile appeal and improved visual appearance. Such soft touch material can be used to prepare a variety of apparatuses where a soft and comforting tactile feel and a smooth appearance are desirable.

SUMMARY

In one aspect, described herein are examples of a composition of a soft touch material that include a thermoplastic elastomer (TPE) substrate and a soft touch coating, wherein the soft touch coating can include about 15% to about 75% by weight of a binder, and about 25% to about 85% by weight of a silicone.

In another aspect, the thermoplastic elastomer substrate includes a poly(styrene-ethylene-butylene-styrene) (SEBS) block copolymer. For example, the SEBS copolymer can include a styrenic phase of about 10% to about 50% by mole of the block copolymer.

In another aspect, the binder is poly(styrene-isobutylene-styrene) (SIBS) block copolymer. For example, the SIBS copolymer can include about 700 to about 1500 isobutylene monomer units and about 150 to about 450 styrene monomer units, about 750 to about 1000 isobutylene monomer units and about 180 to about 320 styrene monomer units, or about 990 to about 1350 isobutylene monomer units and about 240 to about 430 styrene monomer units. The SIBS block copolymer can have an average molecular weight of about 75,000 g/mol to about 100,000 g/mol.

In another aspect, the soft touch coating can have about 30% to about 60% by weight of a binder, where the binder is a SIBS block copolymer.

In another aspect, the silicone can include about 30% to about 85% by weight of a polysiloxane, about 10% to about 50% by weight of a silica matting agent, and a heat curing element. For example, the silicone can include about 40% to about 80% by weight of a polysiloxane, and about 10% to about 50% by weight of a silica matting agent. The median particle size of the silica matting agent is about 1.5 µm to about 25 µm in diameter. The heat curing element is a platinum catalyst having a curing temperature between 100° C. and 180° C.

In another aspect, the soft touch coating can further include one or more solvents, for example, one or more aliphatic hydrocarbon solvents including, for example, pentane, hexanes, heptane, petroleum ether, unbranched paraffin, branched paraffin, naphtha, or a combination thereof. In one aspect, the aliphatic hydrocarbon solvent is naphtha. In another aspect, the aliphatic hydrocarbon solvent is light naphtha having a boiling point of about 30° C. to about 90° C.

In another aspect, the soft touch coating can further include one or more thinners. In one aspect, the one or more thinners are a polar aprotic solvent. For example, the one or more thinners are acetone, acetonitrile, dichloromethane, diethyl ether, acetic esters, tetrahydrofuran, or a combination thereof. The one or more thinners can include an acetic ester. The acetic ester can include methyl acetate or ethyl acetate, or a combination thereof.

In another aspect, a soft touch material can include a SEBS block copolymer and a soft touch coating, where the soft touch coating can include about 30% by weight of a SIBS block copolymer, about 70% by weight of a silicone, one or more aliphatic hydrocarbons, and one or more polar aprotic solvents. In another aspect, a soft touch material can include a SEBS block copolymer and a soft touch coating, where the soft touch coating can include about 50% by weight of a SIBS block copolymer, about 50% by weight of a silicone, one or more aliphatic hydrocarbons, and one or more polar aprotic solvents.

In another aspect, provided herein are methods of preparing a soft touch material including a thermoplastic elastomer substrate and a soft touch coating, where the method includes:

(a) dissolving a SIBS block copolymer in one or more solvents to generate a solution;
(b) mixing the solution of (a) with a silicone, and one or more thinners to generate a mixture; and
(c) spraying the mixture of (b) with a sprayer onto a surface of TPE substrate to generate a sprayed TPE material. The method can further include a curing step in which the sprayed TPE material of (c) is incubated at a temperature below 180° C., for example, at about 100° C. for 30 minutes, or at about 180° C. for 10 minutes. The TPE substrate can undergo E-beam processing prior to spraying of the soft touch coating onto its surface.

In another aspect, provided herein are apparatuses that can be made using the compositions of soft touch material described herein. Examples of such apparatuses include an acoustical device, a wearable device, an earpiece, a soft grip on tools, a soft-grip on sports equipment, an automotive part, a medical device part, a food-contact utensil, a sealing ring, a closure liner for bottle caps, a button, a knob, a wire or cable, a part of a footwear, a smartphone case, a hose or a tube, or a packaging material. In one aspect, the apparatus is an earpiece.

Any two or more of the features described in this specification, including in this summary section, can be combined to form implementations not specifically described herein. The details of one or more implementations are set forth in the accompanying drawings and the description below. Other features and advantages will be apparent from the description and drawings, and from the claims.

Figure 3:
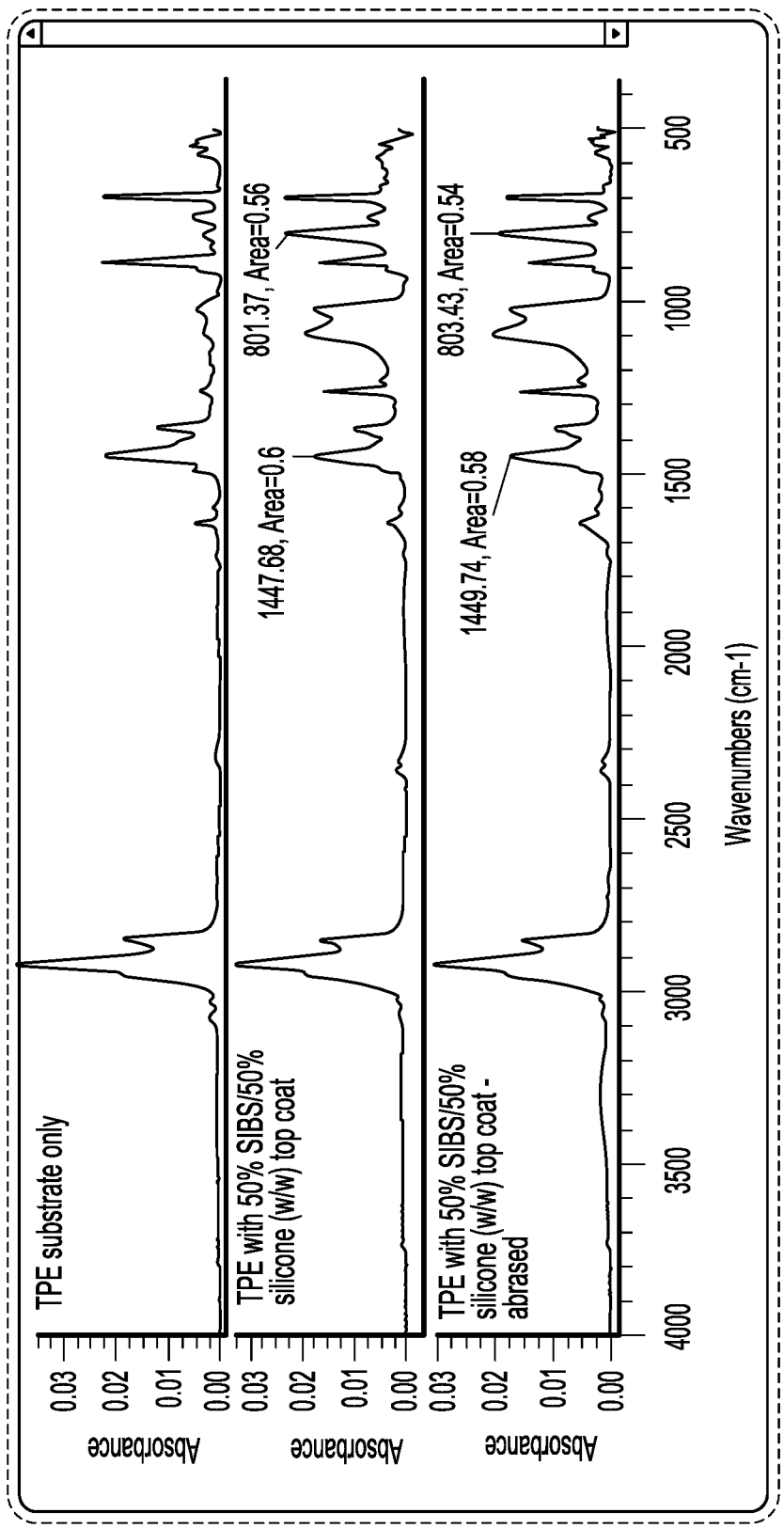

FIG. 3 shows an FT-IR spectral overlay of a TPE substrate (top panel), a TPE substrate treated with a 50% SIBS/50% silicone (wt/wt) soft touch coating (middle panel) and a TPE substrate treated with a 50% SIBS/50% silicone (wt/wt) soft touch coating after mechanical abrasion (bottom panel).

DETAILED DESCRIPTION

The present disclosure describes compositions of a soft touch material, characterized in that it possesses a soft and smooth texture, which provides tactile appeal and improved visual appearance of said material. Soft touch materials are useful in the manufacture of a variety of consumer and commercial products, where a pleasant tactile feel and smooth visual appearance are desirable performance characteristics. For example, soft touch materials are widely used as soft grips on tools, sports equipment, wearable devices, medical and automotive parts, eating utensils, seals, bottle caps and liners, buttons, knobs, cables and wires, footwear, protective cases for electronics and cell phones, hoses and tubes, and packaging materials, among other applications.

Typically, a soft touch material is made from a base material (substrate) and a soft touch coating, where the substrate provides the overall mechanical property of the material, while the soft touch coating provides the desired performance characteristics, i.e., improved tactile feel and premium visual appearance. The selection of an appropriate combination of substrate and soft touch coating depends on a variety of factors, including the target product profile to be made with the soft touch material, manufacturability, cost to manufacture, and durability of the material.

In the case of wearable devices, thermoplastic elastomers (TPE) are gaining in popularity as the material of choice due to their characteristics that are well suited for this type of applications, improved manufacturability, wide range of selections, commercial availability, and reduced costs. Thermoplastic elastomers (also known as thermoplastic rubbers) are a subclass of elastomers, typically comprising synthetic copolymers or a physical blend of synthetic polymers and natural rubbers. The macromolecular polymer molecules within a TPE are held together by a network of physical crosslinks; as such, a TPE can undergo an immediate, linear and reversible response to high strain caused by an applied force (see Shanks, R. & Kong, I. (2012). *Thermoplastic Elastomers*. 10.5772/36807). TPEs are characterized by their good tear and abrasion resistance, high resilience and flexibility, low density (light weight) and excellent resistance to thermal, chemical and moisture. Six generic classes of commercial TPEs are known in the art (according to ISO 18064), including: styrenic block copolymers (TPS or TPE-s), thermoplastic polyolefin (TPO or TPE-o), thermoplastic vulcanizates (TPV or TPE-v), thermoplastic polyurethanes (TPU), thermoplastic copolyester (TPC or TPE-E), thermoplastic polyamides (TPA or TPE-A, nylon), and non-classified thermoplastic elastomers (TPZ). Non-limiting examples of TPE materials include Kraton®, Cawiton®, Thermolast® K and M, Softprene T®, Dryflex®, Mediprene®, and Laprene®, among others. Non-limiting examples of TPO include Enflex®, Hostacom™, Indure™, Thermorun™, and Zelas™, among others. Non-limiting examples of TPV include Santoprene™, Forprene®, Zeotherm®, among others. Non-limiting examples of TPU include Epamould®, Elastollan®, Desmopan®, Estane®, and Pellethane®, among others. Non-limiting examples of TPC include Arnitel®, Hytrel®, and Pibiflex®, among others. Non-limiting examples of TPA include Rilsamid®, Pebax®, and Vestamid-E®, among others.

As used herein, a polymer is defined as a substance with a molecular structure consisting mostly or entirely of a large number of similar units covalently linked together, i.e., repeating subunits. A polymer can be a naturally occurring or synthetic substance. As used herein, a natural rubber (also known as latex, India rubber, Amazonian rubber, caucho or caoutchouc) is defined as naturally occurring polymers comprising mostly isoprene, other minor organic impurities, and water, i.e., polyisoprenes. Natural rubbers are typically harvested as a sticky and milky colloidal substance from rubber trees or other plants.

One challenge in the use of TPEs for the manufacturing of premium wearable devices is the limited availability of good soft touch coating. Plastics, including TPEs, generally do not possess natural surface characteristics that are appealing to most consumers. A common approach to improve the surface characteristics and tactile feel of plastics is to apply a soft touch coating onto its surface. Common soft touch coating formulas include, for example, silicone and thermoplastic polyurethane (TPU), which are polar material in nature and they do not develop good bonding and robustness when applied to non-polar TPEs such as TPS and TPO. This significantly limits the choices of the subclass of TPEs that can be used as the substrate for making these products.

This disclosure describes compositions of a soft touch material suitable for making a variety of products including wearable devices, protective sleeves and cases for consumer electronics, and the soft grip parts of various devices and equipment. The compositions have improved bonding of the soft touch coating to the base material, which enables the material to achieve the desirable functional characteristics of soft and comforting tactile feel and smooth appearance. The improved bonding of the soft touch coating to the TPE substrate further provides improved overall robustness of the material, including better resistance to mechanical stress (e.g., scratching and cracking) and thermal stress.

Figure 1:
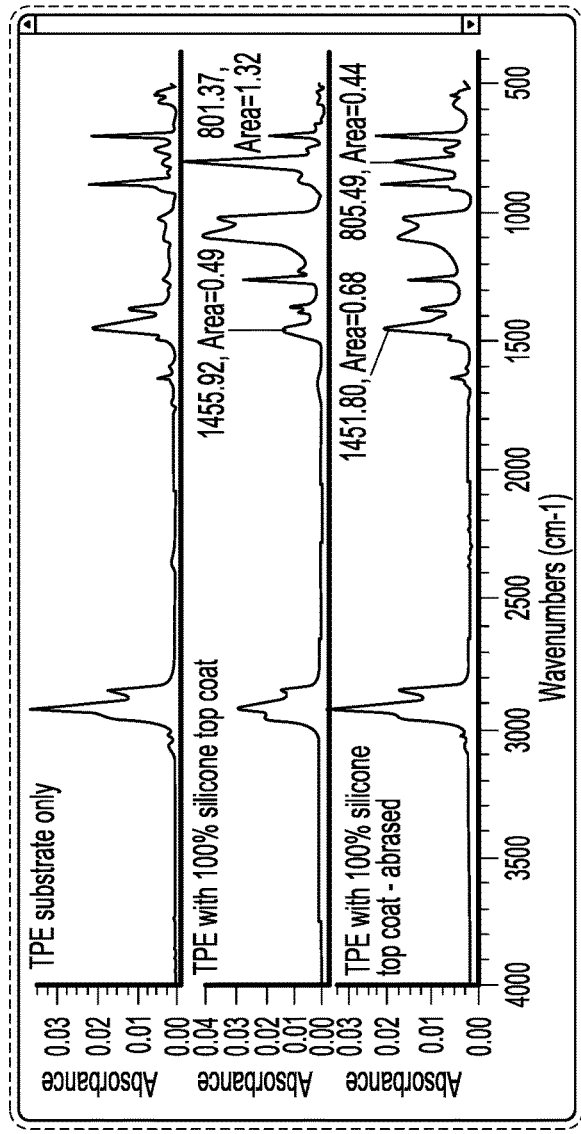
FIG. 1 shows an FT-IR spectral overlay of a TPE substrate (top panel), a TPE substrate treated with a 100% silicone soft touch coating (middle panel) and a TPE substrate treated with a 100% silicone soft touch coating after mechanical abrasion (bottom panel).
Figure 2:
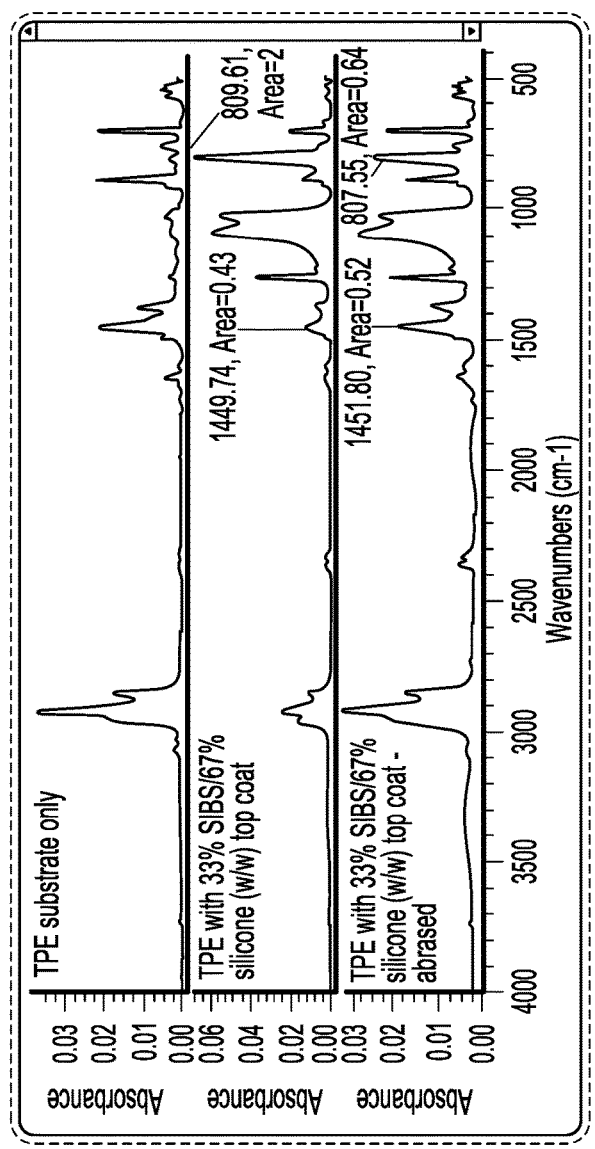
FIG. 2 shows an FT-IR spectral overlay of a TPE substrate (top panel), a TPE substrate treated with a 33% SIBS/67% silicone (wt/wt) soft touch coating (middle panel) and a TPE substrate treated with a 33% SIBS/67% silicone (wt/wt) soft touch coating after mechanical abrasion (bottom panel).

The compositions described herein can include a TPE substrate and a soft touch coating that includes about 15% to about 75% by weight of a binder, and about 30% to about 85% by weight of a silicone, where the TPE is a styrenic block copolymer, poly(styrene-ethylene-butylene-styrene) (SEBS). The polymer repeating unit of a SEBS block copolymer is represented by the formula:

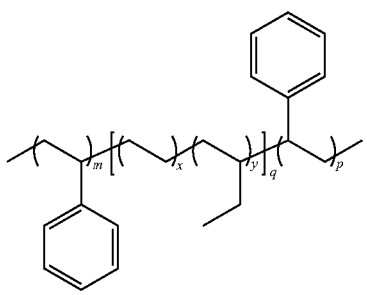

wherein the subscripts m and p together represent the relative molar amount of the styrenic phase, and the subscripts x and y together (or q) represent the relative molar amount of the rubber (isoprenic) phase. The SEBS block copolymer can have a styrenic phase of about 10% to about 80%, about 10% to about 50%, about 10% to about 30%, about 20% to about 50%, about 50% to about 80%, about 10% to about 20%, about 20% to about 30%, about 30% to about 40%, about 40% to about 50%, about 50% to about 60%, about 60% to about 70%, about 70% to about 80%, about 10% to about 50%, about 10% to about 30%, or about 20% to about 50% by mole. For example, the SEBS block copolymer includes about 10% to about 50% by mole of styrenic phase. In some implementations, the TPE substrate is LC-AB5-741C from Avient. In some implementations, the TPE substrate is TC7CEN from Kraiburg. In some implementations, the TPE substrate is 85085A from Covestro. In some implementations, the TPE substrate is OM-19460 from Teknor Apex. The TPE can be characterized by the Fourier Transform-Infrared (FT-IR) spectra as shown in FIG. 1-3 (top panels). For example, the TPE can have one or more FT-IR peaks at wavenumber ($cm^{-1}$) at about 3070, about 2920, about 2850, about 1640, about 1450, about 1370, about 890 and about 700. The TPE can have one or more FT-IR peaks at wavenumber ($cm^{-1}$) at about 2920, about 2850, about 1640, about 1455, about 1370, about 890 and about 700. The TPE can have one or more FT-IR peaks at wavenumber (cm-1) at about 2920, about 2850, about 1455, about 890 and about 700. The TPE can have FT-IR peaks at wavenumber ($cm^{-1}$) at about 2920, about 2850, about 1455, about 890 and about 700. The TPE can have FT-IR peaks at wavenumber ($cm^{-1}$) at about 1455, about 890 and about 700.

The soft touch coating of compositions disclosed herein can include different amounts of a binder, for example, about 10% to about 80%, about 10% to about 50%, about 30% to about 60%, or about 50% to about 80% by weight. The binder can be a diblock or triblock copolymer such as poly(styrene-ethylene-butylene-styrene) (SEBS) block copolymer, poly(styrene-isobutylene-styrene) (SIBS) block copolymer, or poly(styrene-ethylene-propylene-styrene) (SEPS) block copolymer, or a mixture thereof. In some implementations, the binder is a SEBS block copolymer. In some implementations, the binder is a SEPS block copolymer. In some implementations, the binder is a SIBS block copolymer, with the structure of its polymer repeating unit being represented by the following formula:

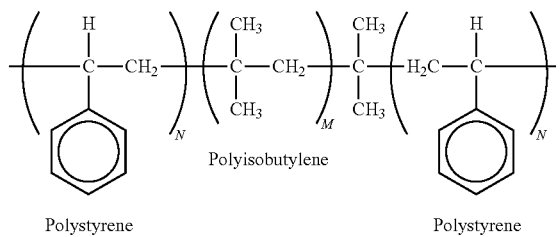

wherein the subscripts M and N represent the number of the corresponding monomer blocks as shown in the formula above. The compositions described herein can be a SIBS block copolymer having different values of M and N, for example, M is from about 700 to about 1500, and N is from about 150 to about 450; M is from about 700 to about 1500, and N is from about 180 to about 320; M is from about 990 to about 1350, and N is from about 240 to about 430; M is from about 700 to about 900, and N is from about 300 to about 450; M is from about 1200 to about 1500, and N is from about 150 to about 250; or M is from about 900 to about 1200, and N is from about 250 to about 450. In some implementations, the SIBS block copolymer has M of about 750 to 1000 and N of about 180 to 320. In some implementations, the SIBS block copolymer has M of about 990 to 1350 and N of about 240 to 430. In some implementations, the SIBS block copolymer is Sibstar™ 73T, 102T or 103T from Kaneka Belgium. In some implementations, the SIBS block copolymer is Kratoni™ D1170 or D1171 from Kraton Corporation.

The SIBS block copolymer can have an average molecular weight of about 20,000 g/mol to about 200,000 g/mol, for example, about 50,000 g/mol to about 150,000 g/mol; about 75,000 g/mol to about 100,000 g/mol; about 100,000 g/mol to about 150,000 g/mol; or about 150,000 g/mol to about 200,000 g/mol. In some implementations, the average molecular weight of the SIBS block copolymer is about 75,000 g/mol. In some implementations, the average molecular weight of the SIBS block copolymer is about 100,000 g/mol. As defined herein, the average molecular weight of a polymer can be represented by the number-averaged molecular weight ($M_n$), the weight-average molecular weight ($M_w$), the Z-average molecular weight ($M_z$) or the molecular weight at the peak maxima of the molecular weight distribution curve ($M_p$). The average molecular weight of a polymer can be determined by a variety of analytical characterization techniques known to those skilled in the art, for example, static light scattering (SLS) analysis, gel permeation chromatography (GPC), nuclear magnetic resonance spectroscopy (NMR), intrinsic viscometry (IV), melt flow index (MFI), and matrix-assisted laser desorption/ionization mass spectrometry (MALDI-MS), and combinations thereof.

The silicone component of the compositions described herein includes a polysiloxane, a silica matting agent, and a heat curing element. In some implementations, the silicone includes about 30% to about 90%, about 50% to about 80%, about 30% to about 40%, about 40% to about 50%, about 50% to about 60%, about 60% to about 70%, about 30% to about 85%, about 40% to about 80%, or about 65% to about 80% by weight of a polysiloxane, which is represented by the following formula:

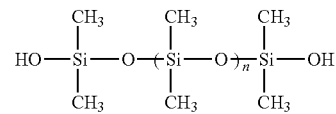

and wherein the subscript n represents the number of siloxane repeating units in the polysiloxane polymer. In some implementations, the silicone includes about 10% to about 70%, about 10% to about 50%, about 10% to about 30%, about 40% to about 50%, about 50% to about 60%, or about 60% to about 70% by weight of a silica matting agent. The median particle size of the silica matting agent is about 1 μm to about 50 μm, about 1 μm to about 10 μm, about 10 μm to about 30 μm, about 25 μm to about 50 μm, or about 1.5 μm to about 25 μm in diameter. In some implementations, the silica matting agent is Acematti™ 3300, 3400 or 3600 from Evonik. In some implementations, the silica matting agent is FMSIL® 412 from 20 Microns. In some implementations, the silica matting agent is Sunsphere® L-121 from Asahi Glass AGC. In some implementations, the silica matting agent is CAB-O-SIL® fumed silica from Cabot Corporation. The silicone of the compositions described herein can be a high temperature vulcanized (HTV) silicone, a room temperature vulcanized (RTV) silicone, or a liquid silicone rubber (LSR). In some implementations, the silicone of the compositions described herein is a high temperature vulcanized silicone (HTV) silicone. Different curing elements can be used to cure the silicone of the compositions described herein. In some implementations, the curing element is a platinum catalyst heat curing element. In some implementations, the curing element is a peroxide-based curing element. In some implementations, the curing element is an oxime-based curing element. The temperature at which the curing is performed is between about 100° C. and about 180° C., about 100° C. and about 120° C., about 120° C. and about 140° C., about 140° C. and about 160° C., or about 160° C. and about 180° C.

The soft touch coating described herein can further include one or more solvents. As used herein, a solvent is a liquid substance capable of dissolving or dispersing one or more substances. In some implementations, the one or more solvents include an organic liquid. In some implementations, the one or more solvents include a nonpolar solvent. As used herein, a nonpolar organic solvent refers to liquid substances that have low dielectric constants and are not miscible with water. In some implementations, the one or more solvents include an aliphatic hydrocarbon solvent, which can be a straight-chain hydrocarbon, a branched hydrocarbon, or a cyclic hydrocarbon. The aliphatic hydrocarbon can be a saturated or unsaturated hydrocarbon. The one or more aliphatic hydrocarbon solvents can be of various chain lengths, for example, a 4-carbon hydrocarbon; a 5-carbon hydrocarbon; a 6-carbon hydrocarbon; a 7-carbon hydrocarbon; an 8-carbon hydrocarbon; a 9-carbon hydrocarbon; a 10-carbon hydrocarbon, or mixtures thereof. Non-limiting examples of aliphatic hydrocarbon solvents include pentane, hexanes, heptane, petroleum ether, unbranched paraffin, branched paraffin, and naphtha, or a combination thereof. In some implementations, the one or more aliphatic hydrocarbon solvents can have a boiling point of about 30° C. to about 90° C., about 30° C. to about 50° C., about 50° C. to about 75° C., or about 75° C. to about 90° C. In some implementations, the aliphatic hydrocarbon solvent is naphtha. In some implementations, the aliphatic hydrocarbon solvent is light naphtha having a boiling point of about 30° C. to about 90° C.

In some implementations, the one or more solvents include an aromatic hydrocarbon solvent. Non-limiting examples of aromatic hydrocarbon solvents include benzene, ethylbenzene, toluene, xylenes, high flash aromatic naphthas, or mixtures thereof. In some implementations, the one or more solvents include a halogenated nonpolar solvent. Non-limiting examples of a halogenated nonpolar solvent include carbon tetrachloride and hexafluorobenzene, or mixtures thereof.

The soft touch coating described herein can further include one or more thinners. As used herein, a thinner is a liquid substance capable of reducing the viscosity of another liquid. In some implementations, the one or more thinners include an organic liquid. In some implementations, the one of more thinners include a nonpolar solvent. In some implementations, the one of more thinners include a polar aprotic solvent. Non-limiting examples of thinners include mineral spirits, acetone, acetonitrile, dichloromethane, diethyl ether, acetic esters, tetrahydrofuran, turpentine, naphtha, toluene, xylene, paraffin, methyl ethyl ketone, dimethylformamide, 2-butoxyethanol, glycol ethers, or mixtures thereof. In some implementations, the one or more thinners include an acetic ester, for example, methyl acetate, ethyl acetate, isopropyl acetate, n-propyl acetate, isobutyl acetate, n-butyl acetate, isoamyl acetate, and amyl acetate, or mixtures thereof. In some implementations, the one or more thinners can be methyl acetate or ethyl acetate, or a combination thereof.

The disclosure also provides compositions of one or more soft touch material having improved bonding of the soft touch coating to the TPE substrate, thereby providing higher resistance to mechanical and thermal stress. For example, the soft touch material can include a SEBS block copolymer as the TPE substrate, and a soft touch coating that includes a SIBS block copolymer binder, a silicone, one or more aliphatic hydrocarbons, and one or more polar aprotic solvents.

Incorporation of a SIBS block copolymer into the soft touch coating is shown to significantly improve the adhesion of the coating to the TPE substrate and its robustness compared to a coating based on silicone only. A TPE substrate sprayed with a soft touch coating made from 100% of silicone (i.e. no SIBS block copolymer) delaminates and whitens when the material is stretched; furthermore, visible scratches were observed and parts of the coating came off upon scratching the surface of the coated material with a fingernail. In contrast, the surface of a TPE sprayed with soft touch coatings that include both a silicone and a SIBS copolymer showed better resistance to scratching and improved bonding between the coating and the underlying TPE substrate. The improved adhesion of the soft touch coating to the TPE substrate can also be detected and quantified using FT-IR spectroscopy. Comparison of the percentage change in the relative peak intensities of the peak at 800 cm$^{-1}$ (corresponding to the silicone component) to the peak at 1455 cm$^{-1}$ (corresponding to the TPE substrate) in the IR spectra upon mechanical abrasion (e.g. scratching with a sharp object) can be used to indicate loss of the soft touch coating upon the abrasion. Three soft touch coating, containing either 0% SIBS/100% silicone (wt/wt), 33% SIBS/67% silicone (wt/wt) or 50% SIBS/50% silicone (wt/wt) were sprayed onto a TPE substrate and subjected to mechanical abrasion. Whereas the coating comprising 50% SIBS/50% silicone (wt/wt) showed only about 0.2% change in the relative peak intensity, indicating minimal loss of the coating material during abrasion; the coating containing lower amount (33%) or no SIBS showed significantly higher percent change of the relative peak intensities after abrasion, indicating significant loss of the coating material during abrasion (Table 1 and FIG. 1-3).

TABLE 1

Percentage changes in the relative IR peak intensities of TPE substrate treated with various soft touch coating

| Soft touch Coating | Relative peak intensity* before abrasion | Relative peak intensity* after abrasion | Percentage change after abrasion (%)** |
|---|---|---|---|
| 100% silicone | 2.69 | 0.65 | 75.8 |
| 33% SIBS/67% silicone (wt/wt) | 4.65 | 1.23 | 73.5 |
| 50% SIBS/50% silicone (wt/wt) | 0.933 | 0.931 | 0.2 |

*Relative peak intensity = (Peak area of the peak at 800 cm$^{-1}$)/(Peak area of the peak at 1455 cm$^{-1}$)
**Percentage change after abrasion = (Relative peak intensity before abrasion)/(Relative peak intensity before abrasion) * 100%

The soft touch coating disclosed herein can include different amounts of a SIBS block copolymer and a silicone, for example, about 10% to about 30%, about 30% to about 50%, or about 50% to about 80% by weight of a SIBS block copolymer, and about 5% to about 25%, about 25% to about 50%, about 50% to about 75%, or about 75% to about 95% by weight of a silicone. In some implementations, the soft touch coating can include about 30% by weight of a SIBS block copolymer and about 70% by weight of a silicone. In some implementations, the soft touch coating can include about 50% by weight of a SIBS block copolymer and about 50% by weight of a silicone. In some implementations, the soft touch coating can include about 60% by weight of a SIBS block copolymer and about 40% by weight of a silicone. In some implementations, the soft touch coating can include about 70% by weight of a SIBS block copolymer and about 30% by weight of a silicone. In some implementations, the soft touch coating can include about 80% by weight of a SIBS block copolymer and about 20% by weight of a silicone.

The soft touch coating of the compositions disclosed herein can further include one or more aliphatic hydrocarbons and one or more polar aprotic solvents. In some implementations, the soft touch material can include a SEBS block copolymer TPE substrate, and a soft touch coating that includes about 30% by weight of a SIBS block copolymer, about 70% by weight of a silicone, one or more aliphatic hydrocarbons, and one or more polar aprotic solvents. In some implementations, the soft touch material disclosed herein can include a SEBS block copolymer TPE substrate, and a soft touch coating that includes about 50% by weight of a SIBS block copolymer, about 50% by weight of a silicone, one or more aliphatic hydrocarbons, and one or more polar aprotic solvents.

A typical method of preparing a composition of soft touch material of the present disclosure is described below, including the following steps:
 (a) dissolving a SIBS block copolymer in one or more solvents to generate a solution;
 (b) mixing the solution of (a) with a silicone, and one or more thinners to generate a mixture; and
 (c) spraying the mixture of (b) with a sprayer onto a surface of a TPE substrate to generate a sprayed TPE material.

The method of preparing soft touch material of the present disclosure can further include a curing step where the sprayed TPE material of step (c) is incubated at a temperature between about 100° C. and about 180° C. for 10 to 30 minutes, for example, at about 100° C. for 30 minutes; at about 120° C. for 25 minutes, at about 140° C. for 20 minutes, at about 160° C. for 15 minutes, or at about 180° C. for 10 minutes.

One major challenge in applying a soft touch coating to a TPE substrate stems from the relatively low resistance to heat of TPEs. Some soft touch coatings require curing at elevated temperature (100° C. or above) during processing, for example, HTV silicone coating, where the underlying TPE substrate can be distorted or even destroyed during the curing step. One way to improve the thermal stability so that the TPE can have better compatibility with high-temperature curing process is through electron-beam (E-beam) processing, which is believed to induce chemical crosslinking in the TPE (for example, see U.S. 2020/0177987A1; U.S. Pat. No. 10,619,022B2; Kashiwagi, M. and Hoshi, Y. (2012) "Electron beam processing system and its application" *SEI Tech. Rev.*, 75, 47-54).

The method of preparing a soft touch material of the present disclosure can further include an E-beam processing step prior to spraying the soft touch coating onto the TPE substrate. As an example, molded ear tips made with an SEBS thermoplastic elastomer (Avient LC-AB5-741C) were deformed after being stressed at 100° C.; in contrast, molded ear tips made with SEBS that has undergone E-beam processing showed little shape distortion when stressed at the same temperature. The E-beam processing can be achieved with any suitable electron gun having a cathode, grid, and an anode to generate a primary electron beam. A magnetic optical system controls how the electron beam contacts the TPE substrate. In some implementations, E-beam processing of the TPE substrate is performed using a high power accelerator available at E-BEAM Services, Inc., having locations in Lebanon, OH, Cranburry, NJ, and Lafayette, IN Changes of crosslinking in the TPE substrate can be detected using a toluene uptake test. The toluene uptake test is performed by measuring the initial weight of a material before immersion in toluene for 24 hours ($W_i$), and measuring the final weight of the material after immersion in toluene for 24 hours ($W_f$). The percentage toluene update is calculated using the formula $(W_f-W_i)/W_i*100\%$.

Without being limited to certain combinations, an apparatus can have one or more of its components made from one or more compositions provided herein. The apparatus can be an acoustical device, a wearable device, an earpiece, a soft grip on tools, a soft grip on sports equipment, an automotive part, a medical device part, a food-contact utensil, a sealing ring, a closure liner for bottle caps, a button, a knob, a wire or cable, a footwear, a sleeve for electronics, a smartphone case, a hose or a tube, or a packaging material. For example, the tip of an in-ear earpiece can be made from one or more compositions provided in this disclosure. Other examples of an apparatus include a protective case for a smartphone, and the boots on the bottom of portable Bluetooth speakers.

As used herein, and unless otherwise specified, the term "about," when used in connection with a numeric value or range of values is to indicate that the value or range of values may deviate to an extent deemed reasonable to one of ordinary skill in the art. In general, the term "about" is used herein to modify a numerical value above and below the stated value by a variance of 10% unless otherwise specified. For temperature values in degree Celsius (° C.), the term "about" is used to indicate the stated value±3° C. For wavenumber values in $cm^{-1}$, the term "about" is used to indicate the stated value±5 $cm^{-1}$. It is well known that instrument variation and other factors can affect the numerical values. The term "about" is to accommodate these variations.

What is claimed is:

1. A composition of a soft touch material comprising:
 (i) a thermoplastic elastomer (TPE) substrate wherein the thermoplastic elastomer substrate comprises a poly (styrene-ethylene-butylene-styrene) (SEBS) block copolymer; and
 (ii) a soft touch coating, wherein the soft touch coating consists of
  (a) 50% by weight of a binder
   wherein the binder of (a) is a poly(styrene-block-isobutylene-block-styrene) (SIBS) block copolymer with an average molecular weight of 117,000 g/mol that comprises 15 wt % polystyrene; and
  (b) 50% by weight of a silicone component
   wherein the silicone component of (b) consists of about 30% to about 85% by weight of a polysiloxane, about 10% to about 50% by weight of a silica matting agent, and a heat curing element.

2. The composition of claim 1, wherein the SEBS block copolymer comprises styrenic phase of about 10% to about 50% by mole.

3. The composition of claim 1, wherein the silicone component has about 40% to about 80% by weight of the polysiloxane.

4. The composition of claim 1, wherein the silica matting agent has particles with a median particle size of about 1.5 µm to about 25 µm in diameter.

5. The composition of claim 1, wherein the heat curing element is a platinum catalyst having a curable temperature between 100° C. and 180° C.

* * * * *